United States Patent [19]

Dieter et al.

[11] 4,035,580
[45] July 12, 1977

[54] SWITCHING ARRANGEMENT FOR TRANSMITTING SYNCHRONOUSLY AND ASYNCHRONOUSLY OCCURRING DATA

[75] Inventors: Georg Dieter, Konigsdorf; Harald Franke, Munich, both of Germany

[73] Assignee: Siemens Aktiengesellschaft, Munich, Germany

[21] Appl. No.: 683,274

[22] Filed: May 5, 1976

[30] Foreign Application Priority Data

May 9, 1975 Germany .................. 2520835

[51] Int. Cl.² .................. H04L 5/00; H04J 3/16
[52] U.S. Cl. .................. 178/50; 179/15 BA
[58] Field of Search ...... 179/15 BA, 15 BV, 15 BS, 179/15 AF, 15 A, 15 AL; 178/50

[56] References Cited
U.S. PATENT DOCUMENTS

| | | | |
|---|---|---|---|
| 3,668,645 | 6/1972 | Reymond et al. | 179/15 BA |
| 3,794,768 | 2/1974 | Carney et al. | 178/50 |
| 3,975,593 | 8/1976 | Fick | 179/15 BV |

Primary Examiner—Thomas A. Robinson
Attorney, Agent, or Firm—Gerald L. Lett

[57] ABSTRACT

A circuit arrangement for transmitting synchronously and asynchronously occurring data is described. The synchronous data are transmitted using a plesiochronous, synchronous data transmission system. Additionally, at the send side, a submultiplexer receives asynchronous data and transmits that data synchronously with the send-side clock signal to the send-side multiplexer. The aforementioned transmitted data are received at a receive-side multiplexer and coupled to a receive-side submultiplexer for transmission to receive-side subscribers. Both submultiplexers operate in accordance with identical clock signals.

2 Claims, 2 Drawing Figures

SWITCHING ARRANGEMENT FOR TRANSMITTING SYNCHRONOUSLY AND ASYNCHRONOUSLY OCCURRING DATA

BACKGROUND OF THE INVENTION

This invention relates to a circuit for transmitting synchronously and asynchronously occurring data, of which the synchronously occuring data are transmitted by means of a plesiochronous data transmission system.

A plesionchronous synchronous data transmission system, as is known, is comprised of a send-side multiplexer having two or more inputs and one output, a receive-side multiplexer having one input and two or more outputs, an autonomous send-side clock generator, and an autonomous receive-side clock generator, whose clock frequencies generally differ slightly from one another. The output of the send-side multiplexer and a send-side transmission equipment are connected by a communication link and by a receive-side transmission equipment to the input of the receive-side multiplexer.

By using a known plesiochronously operated synchronous data communication link, synchronously data may be transmitted. Both on the send-side and on the receive-side there are provided autonomous central clock generators, whose clock signal frequencies differ slightly from one another and deviate only a little from a given nominal value. In addition, a send-side multiplexer is operated with send-side clock signal which are derived by means of the send-side central clock generator, and a receive-side multiplexer is operated concurrently therewith. Buffer storages are connected to outputs of the receive-side multiplexer. The data are routed to the buffer storages in synchronism with the clock pulse of the send-side clock signal and transmitted in synchronism with the clock pulse of the receive-side clock signals. This operating mode is called a plesiochronous operation. Accurate data transmission is possible despite the slightly different clock frequencies if the data appearing synchronously at the individual inputs of the send-side multiplexer are routed with blank intervals within a predetermined bit frame, it being assumed that the buffer storage capacities are sufficiently large to compensate for the speed differences between the data on the receive-side. If the capacity of the receive-side buffer storages is insufficient, it may be expected that the send-side bit frame differs from that of the receive-side, thereby producing an occasional "bit slip".

If, in addition to data occuring synchronously, asynchronously occuring data must also be transmitted, it is conceivable, in principle, to transmit with an asynchronous data transmission system both the synchronously and the asynchronously occuring data. Such a system would, however, have the disadvantage that it requires a larger transmission capacity for transmitting synchronously occurring data than when using a plesiochronously operated sychronous data transmission system.

It is possible by means of a plesiochronously operated synchronous data transmission system to transmit to receive-side subscribers the synchronously occurring data and the synchronously occurring data by using a send-side submultiplexer, the send-side multiplexer, the communication link, the receive-side multiplexer, and a receive-side submultiplexer. In the latter case the send-side devices and the send-side submultiplexer are pul- d by means of an autonomous send-side clock generated, and the receive-side devices and the receive-side submultiplexer are pulsed by means of the autonomous receive-side clock generator. Assuming this, the send-side submultiplexer would emit synchronously occurring data, which could be transmitted synchronously to the receive side. However, these synchronously queueing data of the send-side submultiplexer queue without spaces between them, so that rate differences between the data on the send-side and those on the receive-side could not be compensated by the means of a buffer storage. Thus, it must be assumed that a bit slip occurs in the area of the receive-side submultiplexer, which causes failure of the time division mutiplex frame alignment, so that all output channels of the receive-side submultiplexer are momentarily blocked, and a phase readjustment of the system is necessary.

An object of the invention is, therefore, to provide a means for transmitting, by means of a plesiochronously operated synchronous data transmission system, synchronously occurring data and asynchronously occuring data without causing a bit slip.

More particularly, it is an additional object of the invention to transmit under the circumstances specified above synchronously occurring data and code-frame-found data or data through asynchronously occurring bit transitions without the danger of a bit slip.

Code-frame-found data are understood to mean, for example, telegraph signals, each of which consists of a start bit, two or more information bits and one stop bit. It is assumed that the individual signals occur asynchronously at arbitrary times, even if the individual bits of each signal lie in different bit frames. Thus, the data both in the code-frame-found data and in the asynchronously occurring bit transitions are asnchronously occurring data.

SUMMARY OF THE INVENTION

These and other objects of the invention are achieved in that a send-side submultiplexer is provided, over whose inputs asynchronously occurring data are routed and via whose output synchronously occuring data are transmitted in synchronism with a send-side clock signal of an autonomous send-side clock generator to one of the inputs of the send-side multiplexer. A receive-side submultiplexer is provided having an input for receiving data from one of the outputs of the receive-side multiplexer, to which is routed a receive-side clock signal identical to the send-side autonomous clock generator.

The switching arrangement constructed in accordance with the principles of this invention is characterized in that existing plesiochronously operated, synchronous data transmission systems can be reconstructed simply with a view to transmitting asynchronously occuring data. Compared with an asynchronous data transmission system, the switching arrangement in accordance with the invention is characterized in that for the transmission of synchronously occuring data it needs a relatively smaller transmission capacity. Thus, the switching arrangement accordng to the invention prevents a bit slip in the region of the asynchronous data channels, so that there is no danger that the time division multiplex frame alignment will fail and no phase readjustment of the system is needed.

BRIEF DESCRIPTION OF THE DRAWINGS

The principles and features of the inention will be more readily understood from the following detailed description and drawings of a preferred embodiment in which like references denote like parts and wherein.

DECRIPTION OF THE PREFERRED EMBODIMENT

Figure 1:
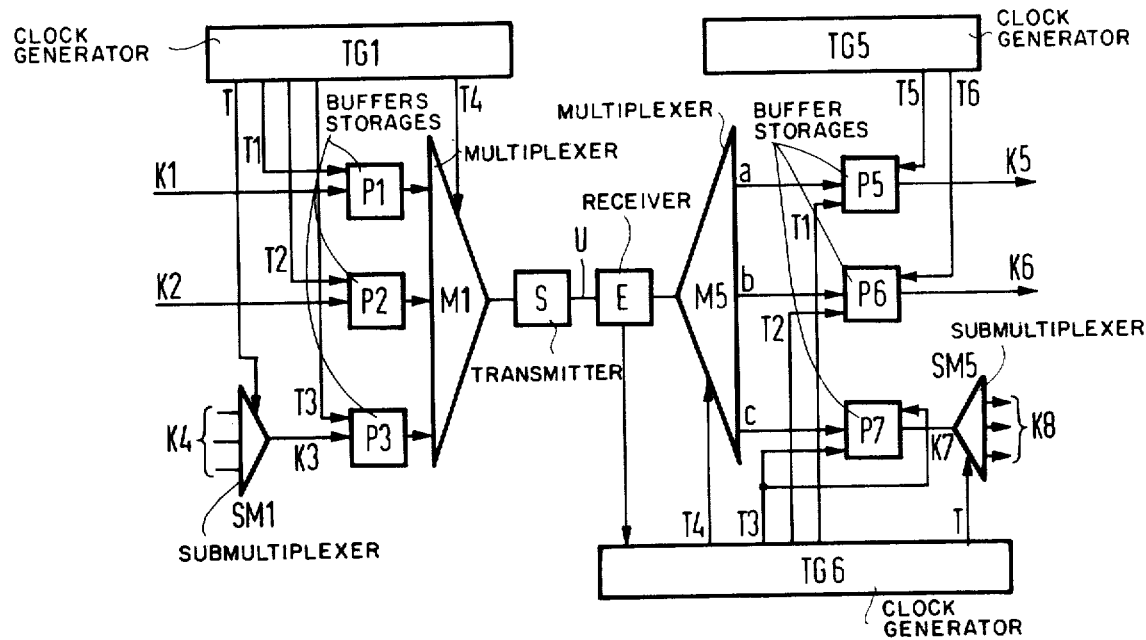
FIG. 1 is a block-schematic diagram or a data transmission system, wherein data are transmitted over a send-sided multiplexer and a receive-side multiplexer
Figure 2:
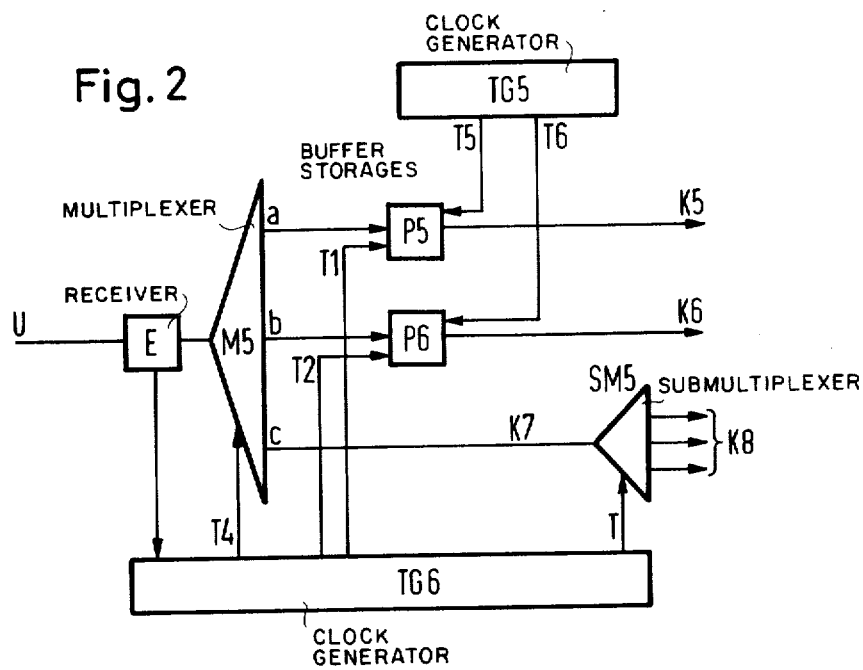
FIG. 2 is a block-schematic diagram of a modification of the receive-side equipment of the system shown in FIG. 1.

In the send-side, the system shown in FIG. 1 comprises a multiplexer M1, a submultiplexer SM1, buffer storages P1, P2, P3, a clock generator TG1 and send-side transmission equipment S. In the receive side, the system comprises receive-side transmission equipment E, a mutliplexer M5, a submultiplexer SM5, clock generators TG5, TG6 and buffer storages P5, P6, P7.

The clock generators TG1 and TG5 are autonomous clock generators operated at slightly different fundamental frequencies which each differ slightly from a nominal frequency. In the clock generator TG1 the clock signals T, T1, T2, T3, T4 are generated through frequency division, and in the clock generator TG5 the clock signals T5 and T6 are generated as a function of the fundamental frequency available therein. The clock signal T1 and corresponding clock signal T5 have only slightly different frequencies. Likewise, the clock signals T2 and T6 differ in frequency only slightly. Thus, a plesiochronous operation is implied in the buffer storages P1, P2, P5, P6. The clock signals T, T1, T2, T3 generated on the send-side are recovered from the time division multiplex signal transmitted over the communication link U by means of the clock generator TG6 on the receive-side.

The data applied to channels K1 and K2 lie in prespecified bit frames, so that the channels K1 and K2 may be designated as synchronizing channels. The clock signals T1 or T2 are tuned to the appropriate bit frame so that no bit slip is expected as the synchronous data are trnasferred into the buffer storages P1 or P2.

The data are transferred into the multiplexer from the outputs of the buffer storages P1 or P2 and coupled by the transmission equipments S and E to the receive-side multiplexer M5, from which they are written into the buffer storage P5 or P6 in synchronism with the clock pulse of the signals T1 or T2. The data, so stored, are read out in synchronism with the clock pulse of the clock signals T5 or T6 and emitted from the system by channels K5 or K6. With this plesiochronous operation it is likewise assumed thatthe data received through channels K1 or K2 are emitted to the buffer storages P1 or P2 with blank intervals, and it is likewise assumed that the capacities of the buffer storages P5 or P6 are large enough to compensate for bit frame differences due to the different clock frequencies of the signals T1 and T5 or T2 and T6. For clarity, only two synchronizing channnels K1, K2 and K5, K6 are shown, whereas in practice a substantially greater number of such channels are generally provided.

The transmission of synchronous data has been described with reference to FIG. 1. It was assumed in the latter description that these data occurring in prespecified bit frames are supplied with blank intervals and are transmitted via the communication link U. The two submultiplexers SM1 and SM5 are provided in order to be able to transmit asynchronously occurring data also. It is thus assumed that data received by channels K4 are not in prespecified bit frames and, therefore, called asynchronous. For example, they may be data transmitted only through their bit transitions, and it is immaterial at what instants these bit transitions occur. Also code-frame-found data may be involved wherein the start elements, information elements and stop elements are not in a prespecified bit frame. By means of the submultiplexer SM1 and the buffer storages not shown herein, the asynchronously occurring data received through the channels K4 are transformed into synchronized data under the control of the clock system of the clock generator TG1, because the submultiplexer SM1 is operated with the clock signal T.

Synchronous data are emitted from the output of the submultiplexer SM1 so that the channel K3, like the channels K1 and K2, may be called synchronizing channels. Thus, no bit slip is expected, since data are fed to the multiplexer M1 via the channel K3 and the buffer storage P3. The data received via the channel K4 are thus transferred via the communication link U to output c of multiplexer M5. Although synchronous data await service at the output c, as at the outputs a and b, the prerequisite that the data queue with intervals is no longer valid for the data emitted from output c. Rather, it must be presumed that they are emitted without intervals from the output c in the frame of the multiplex signal emitted from the submultiplexer SM1, so that an adjustment to different bit frames may be carried, not by means of buffer storages only, as in the case of the buffer storages P5 and P6.

To avoid a bit slip, in this case where data are transferred without intervals, the submultiplexer SM5 is provided. The outputs of SM5 emit the data to the channels K8 corresponding to the channels K4. The data routed over the output c of the multiplexer M5 are fed under the control of the timing pulse T3 into the buffer storage P7, and in contrast to the pulsing of the buffer storages P5 and P6 are emitted with the same timing pulse T3 to the input of the submultiplexer SM5. While the channels K5 and K6 emit data under the control of the timing pulse of clock signals T5 and T6 generated with the clock generator TG5, data are emitted via the channel K7 in synchronism with the timing pulse of the clock signal T3, which is identical to the clock signal T3 generated with the clock generator TG1.

The submultiplexer SM5 is not pulsed with a clock signal from the clock generator TG5, but with the clock signal T of the send-side clock generator TG1, with which the submultiplexer SM1 is also pulsed. A synchronously occurring data are emited via the channels K8 just as with the corresponding channels K4. Thus, by means of the submultiplexer SM1, SM5 and the buffer storage P7, and through special pulsing of this buffer storage P7 and the submultiplexer SM5, it is possible, usng plesiochronously operated synchronous data transmission system comprised of the two multiplexers M1 and M5, to transmit a synchronously occurring data from the transmission equipments S, E and from the clock generators TG1, TG5 without intermissions and without the danger of bit slips.

The preferred embodiment described hereinabove is intended only to be exemplary of the principles of the invention. It is contemplated that the described embodiment can be modified or changed in a number of ways known to those skilled in the art without departing from the scope of the invention as defined by the appended claims.

We claim:

1. Apparatus for transmitting synchronously and asynchronously occuring data, comprising:

send-side multiplexer means having at least two inputs, at least one of which is connected to receive synchronous data, and an output coupled to a transmission link, receive-side multiplexer means having an input coupled to the transmission link and at least two outputs, first and second autonomous clock generators connected, respectively, to said send-side and receive-side multiplexer means for timing the operations of the multiplexer means, send-side submultiplexer means having inputs connected to receive asynchronous data and an output coupled to an input of said send-side multiplexer means for emitting thereto the asynchronous data in synchronized form under the control of a first clock signal from said first clock generator, and receive-side submultiplexer means having an input connected to receive the asynchronous data in synchronized form from said receive-side multiplexer means and under the control of a second clock signal from said second generator for emitting the asynchronous data in asynchronous form to receive-side subscribers.

2. The apparatus defined in claim 1 wherein said first and second clock signals are of identical repetition rates.

* * * * *